(12) United States Patent
Kitamura (10) Patent No.: US 6,825,959 B2
(45) Date of Patent: Nov. 30, 2004

(54) HOLOGRAPHIC VIEWING DEVICE, AND COMPUTER-GENERATED HOLOGRAM FOR THE SAME

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/632,829

(22) Filed: Aug. 4, 2003

(65) Prior Publication Data

US 2004/0027627 A1 Feb. 12, 2004

(30) Foreign Application Priority Data

Aug. 2, 2002 (JP) ........................................ 2002-225605

(51) Int. Cl.[7] .................................................. G03H 1/00
(52) U.S. Cl. ................... 359/3; 359/29; 359/9; 359/1; 359/13; 359/22; 359/32; 351/51
(58) Field of Search ............................... 359/3, 9, 13, 1, 359/2, 22, 25, 29, 32; 351/51, 52, 158

(56) References Cited

U.S. PATENT DOCUMENTS 5,546,198 A * 8/1996 van der Gracht et al. ...... 359/1
6,452,699 B1 * 9/2002 Athale et al. ................. 359/13

* cited by examiner

Primary Examiner—Fayez G. Assaf
(74) Attorney, Agent, or Firm—Sughrue Mion, PLLC (57) ABSTRACT

The invention relates to a holographic viewing device that has a high diffraction efficiency, enables bright patterns with less noticeable conjugate or higher-order images to be viewed in place of light sources in a scene and is easy to fabricate with consistent characteristics. The holographic viewing device comprises a frame and a computer-generated hologram constructed as a transmission Fourier transform hologram and fitted in the frame. The computer-generated hologram 20 comprises minuscule cells having pitches $\delta_x$ and $\delta_y$, with a reconstruction image area 30 defined by a range of spreading of ± first-order diffracted light of given wavelength from a diffraction grating having grating pitches $2\delta_x$ and $2\delta_y$ that are twice as large as the pitches of cells, and an input image pattern, reconstructed at that wavelength in a range of up to ⅔ of the reconstruction image area 30, is recorded in the computer-generated hologram.

8 Claims, 6 Drawing Sheets

FIG. 6(b2) Occurrence of isolate patterns

HOLOGRAPHIC VIEWING DEVICE, AND COMPUTER-GENERATED HOLOGRAM FOR THE SAME

BACKGROUND OF THE INVENTION

The present invention relates generally to a holographic viewing device and a computer-generated hologram for the same, and more particularly to holographic spectacles that enable bright images to be viewed in a stable manner and a computer-generated hologram for the same.

U.S. Pat. No. 5,546,198 has proposed holographic spectacles constructed as shown in the perspective view of FIG. 7(a). As shown, two transmission holograms 2 and 3 are fitted in the two-eye sections of a spectacle frame 1. When the spectacles are used to view a scene including such limited extent light sources 4, 5, 6 and 7 as shown in FIG. 7(b), the user would see it as if shown in FIG. 7(c) as an example. In other words, the user would see the pre-selected patterns "NOEL" 8, 9, 10 and 11 in place of the light sources 4, 5, 6 and 7 in the natural scene of FIG. 6(b). For the transmission holograms 2 and 3 having such characteristics, Fourier transform holograms (Fraunhofer holograms) of the aforesaid pattern "NOEL" designed as computer-generated holograms are used.

In a computer-aided Fourier transform hologram, a limited rectangular area including a pattern (for instance, "NOEL" as mentioned above) recorded in that hologram is divided into a matrix array of cells, so that information regarding a pattern portion corresponding to each cell site can be allocated to each cell, so that a pattern comprising a limited number of cells is projected onto a hologram area far away from it upon Fourier transform. As is the case with the pattern recording area, the hologram area, too, is divided into a matrix array of cells to record amplitude information and phase information at each cell site where the pattern to be recorded is subjected to Fourier transform.

Thus, the Fourier transform computer-generated hologram with pre-selected patterns recorded in it comprises a finite number of cells, and so the diffraction efficiency is not always high. Further, the pattern viewed through the above holographic spectacles is not always bright, and higher-order diffraction images are superposed on that pattern. Furthermore, higher-order diffraction images are seen around and adjacent to the main pattern. Thus, this computer-generated hologram has not sufficient easy-to-view properties.

Such a computer-generated hologram is now fabricated by means of photolithography using a mask made by fast Fourier transformation. However, a photolithographic pattern for that mask is very fine, and so it is not easy to fabricate computer-generated holograms capable of reconstructing a given pattern in a stable fashion.

SUMMARY OF THE INVENTION

In view of such problems with the prior art, the object of the present invention is to provide a holographic viewing device that has a high diffraction efficiency, enables bright patterns to be viewed in place of light sources in a scene without noticing conjugate images or high-order images if any, and is easy to fabricate with consistent characteristics, and a computer-generated hologram for the same.

According to the present invention, the above object is achieved by the provision of a holographic viewing device comprising a frame and a computer-generated hologram constructed as a transmission Fourier transform hologram and fitted in said frame, characterized in that said computer-generated hologram comprises minuscule cells having pitches $\delta_x$ and $\delta_y$, with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern, reconstructed at said wavelength in a range of up to ⅔ of said reconstruction image area, is recorded in said computer-generated hologram.

Preferably in this case, said input image pattern, reconstructed in a range of up to ½ of said reconstruction image area for said computer-generated hologram, should be recorded in said computer-generated hologram.

Preferably, said computer-generated hologram should comprise a phase hologram.

Preferably, said computer-generated hologram should have a phase distribution multivalued to four or more levels.

The present invention also provides a computer-generated hologram constructed as a transmission Fourier transform hologram for a viewing device, wherein said computer-generated hologram comprises minuscule cells having pitches $\delta_x$ and $\delta_y$, with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern, reconstructed at said wavelength in a range of up to ⅔ of said reconstruction image area, is recorded in said computer-generated hologram.

Preferably in this case, said input image pattern, reconstructed in a range of up to ½ of said reconstruction image area for said computer-generated hologram, should be recorded in said computer-generated hologram.

Preferably, said computer-generated hologram should comprise a phase hologram.

Preferably, said computer-generated hologram should have a phase distribution multivalued to four or more levels.

In the present invention, the computer-generated hologram comprises minuscule cells having pitches $\delta_x$ and $\delta_y$, with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern, reconstructed at said wavelength in a range of up to ⅔ of said reconstruction image area, is recorded in said computer-generated hologram. It is thus possible to achieve a Fourier transform hologram comprising a computer-generated hologram for a holographic viewing device, which enables bright patterns with less noticeable conjugate or higher-order images to be viewed in place of light sources in the scene that is seen through the viewing device, and is easy to fabricate with consistent characteristics.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 6(a1) to 6(c2) are illustrative of input images, and photomask patterns for implementing phase modulations corresponding to the input images.

DESCRIPTION OF THE PREFERRED EMBODIMENTS

Embodiments of the holographic viewing device of the invention and the computer-generated hologram for the same are now explained.

Figure 1:
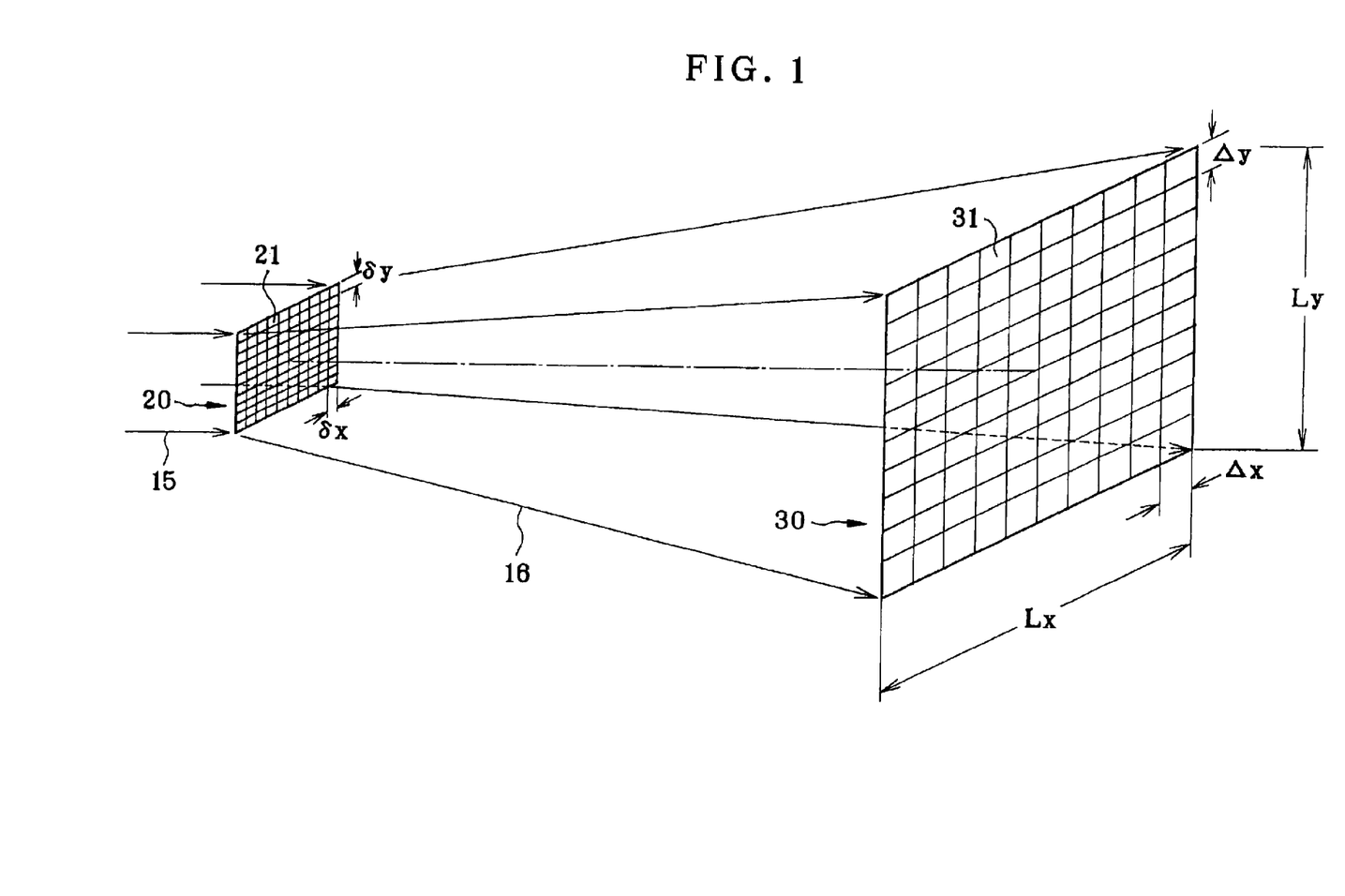
FIG. 1 is illustrative in schematic of a computer-generated hologram mounted on the frame of the holographic spectacles of the invention, and an image area reconstructed from the same.
Figure 7A:
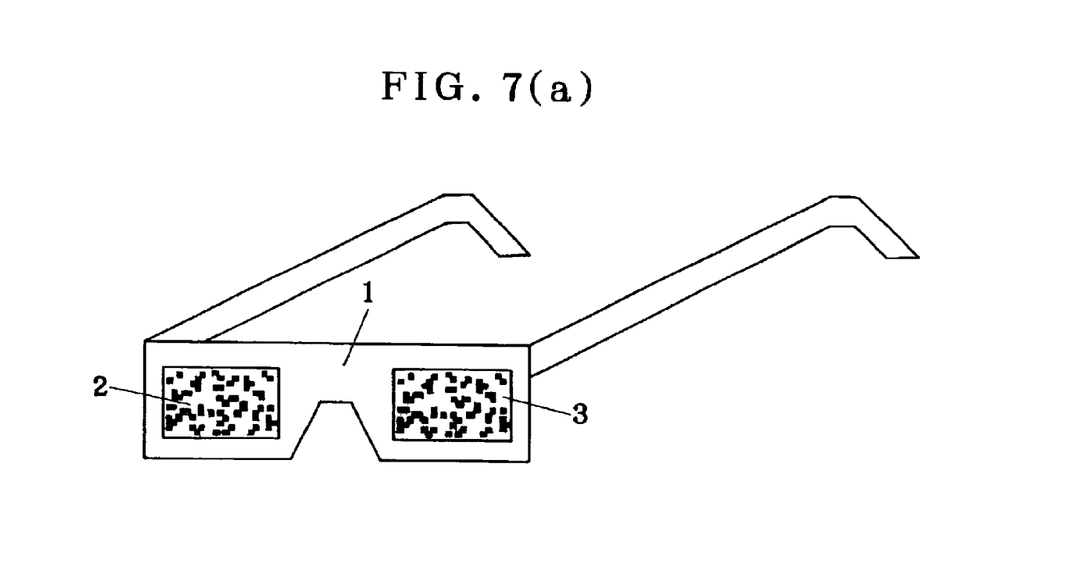
FIGS. 7(a), 7(b) and 7(c) are illustrative of conventional holographic spectacles and how they work.
Figure 7B:
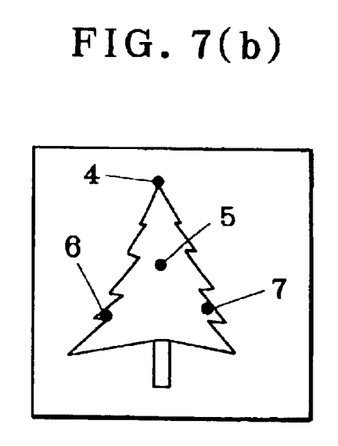
Figure 7C:
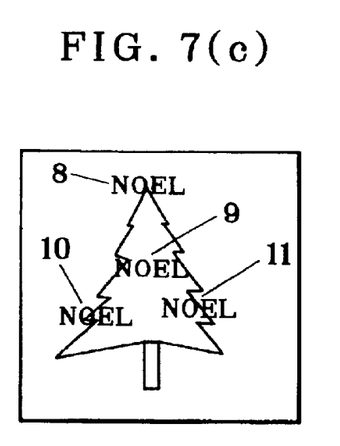

FIG. 1 is illustrative in schematic of a computer-generated hologram 20 (corresponding to the transmission holograms 2, 3 of FIG. 7(a)) to be mounted on the frame of the holographic spectacles of the invention, and an image area 30 reconstructed from the same. The computer-generated hologram 20 is a Fourier transform hologram that comprises an array of minuscule cells 21 arranged in a matrix form with a size $\delta_y$ in the column (y-axis) direction and a size $\delta_x$ in the row (x-axis) direction. In this embodiment, each cell has phase information alone, as described later. The matrix array has $2^m$ cells 21 in the x-axis direction and $2^n$ cells 21 in the y-axis direction.

On the other hand, the image area 30 positioned far enough from the computer-generated hologram 20 comprises an array with $2^m \times 2^n$ cells 31 in the x- and y-directions, corresponding to the computer-generated hologram 20. Each cell 31 has a size $\Delta_y$ in the column (y-axis) direction and a size $\Delta_x$ in the row (x-axis) direction, and the image area 30 has a length $L_x$ in the x-axis direction and a length $L_y$ in the y-axis direction.

The lengths $L_x$ and $L_y$ of the image area 30 in the x- and y-axis directions have correlations with the sizes $\delta_x$ and $\delta_y$ of the cell 21 of the computer-generated hologram 20 in the x- and y-axis directions, respectively. In terms of the angle of diffraction from the computer-generated hologram 20 (the image area 30 is positioned far enough from the computer-generated hologram 20, and so the $L_x$ and $L_y$ should preferably be given by angle), $L_x$ corresponds to a range contained in the spreading of the ± first-order diffracted light from a diffraction grating having a spatial frequency of $1/(2\delta_x)$ and $L_y$ corresponds to a range contained in the spreading of the ± first-order diffracted light from a diffraction grating having a spatial frequency of $1/(2\delta_y)$. This correspond to the fact that the maximum spatial frequency recorded in the computer-generated hologram 20 is $1/(2\delta_x)$ in the x-axis direction and $1/(2\delta_y)$ in the y-axis direction.

As, in such positions relations, parallel light 15 having a given wavelength enters the computer-generated hologram 20 from its front, diffracted light 16 occurs on the back surface side of the computer-generated hologram 20, so that a pattern recorded in the computer-generated hologram 20, for instance, such a letter "F" as described later is reconstructed on the image area 30 far away from the hologram 20. Accordingly, when the computer-generated hologram 20 is used instead of spectacle lenses to view a scene from the front, the user would see the letter "F". Thus, when the computer-generated hologram 20 is used to view such a scene as typically shown in FIG. 7(b), the user would see the pattern "F" in place of light sources 4, 5 and 7.

A specific embodiment of how to calculate the phase information of each cell 21 such that the computer-generated hologram 20 reconstructs the pattern "F" is now explained. To impart given diffracted light to a reconstruction image plane, this embodiment relies on a method of calculating a computer-generated hologram to be located on a hologram surface while Fourier transform and inverse Fourier transform are alternately repeated between the reconstruction image plane and the hologram surface with the application of a bound condition. For that method called Gerchberg-Saxton iterative calculation method, for instance, see "Holograms and Diffraction Type Optical Elements—from fundamental theories to industrial applications" used as the text at the 22nd Winter Seminar held by the Optics Society of Japan (the Applied Physics Society of Japan), pp. 36–39.

Figure 2:
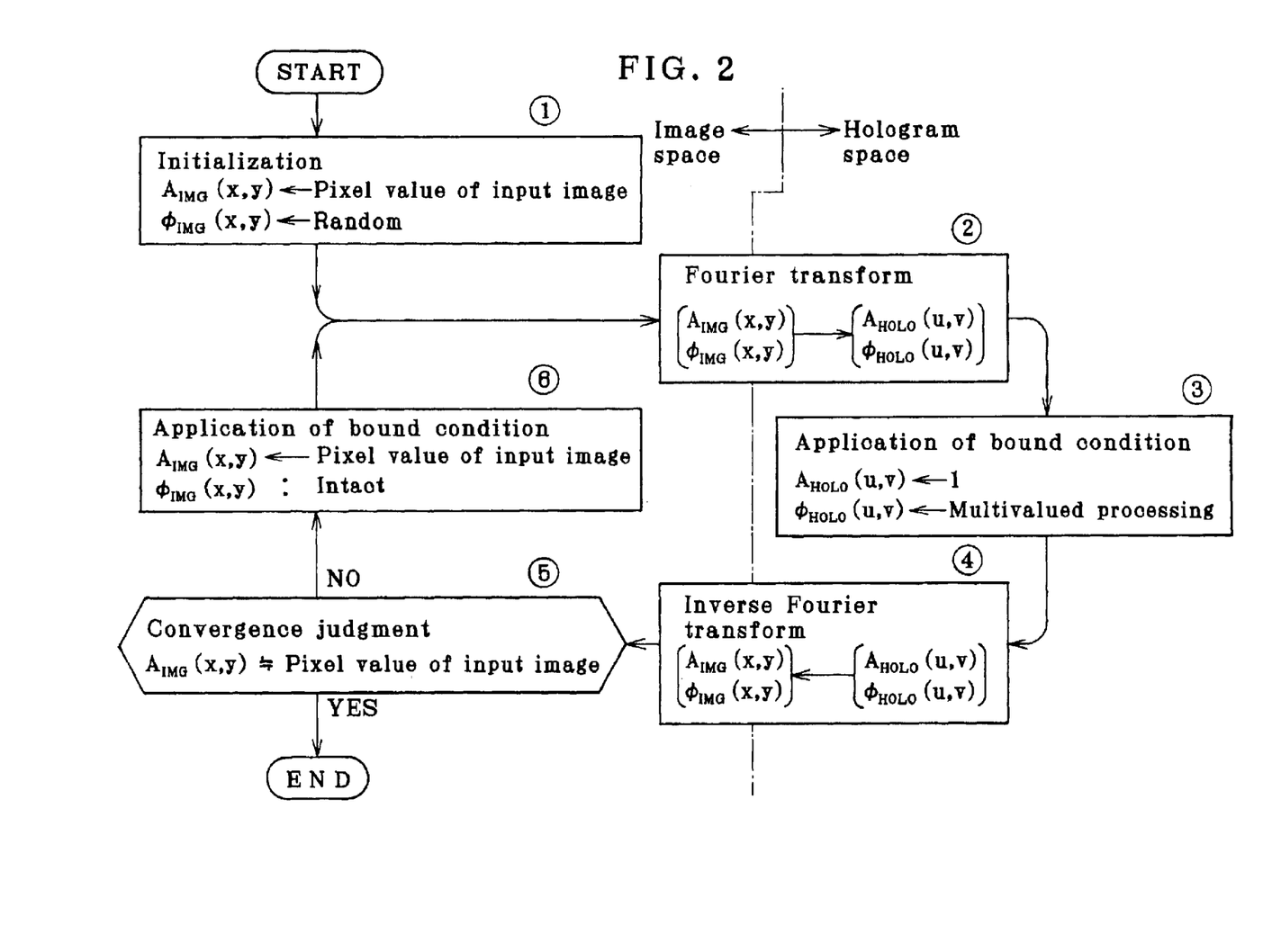
FIG. 2 is a flowchart of the steps for obtaining the computer-generated hologram of the invention.

To help understand the invention, suppose here that $A_{IMG}(x, y)$ is the amplitude distribution (pixel value) of an input image on the reconstruction image plane 30, $\phi_{IMG}(x, y)$ the phase distribution of the input image on the reconstruction image plane 30, $A_{HOLO}(u, v)$ the amplitude distribution of the input image on the hologram surface 20, and $\phi_{HOLO}(u, v)$ the phase distribution of the input image on the hologram surface 20. As shown in FIG. 2, in step (1) the pixel value of the input image to be recorded is given as $A_{IMG}(x, y)$ at the reconstruction image plane 30 area to initialize the phase distribution of the input image to a random value, and in step (2), Fourier transform is performed on the initialized value. In step (3), the amplitude distribution $A_{HOLO}(u, v)$ on the hologram surface 20, obtained by Fourier transform, is assumed to be unity to give a determined bound condition to make a multivalued phase distribution $\phi_{HOLO}(u, v)$ (quantization) After such a bound condition has been imparted, in step (4) inverse Fourier transform is performed on the amplitude distribution $A_{HOLO}(u, v)$ and phase distribution $\phi_{HOLO}(u, v)$ to which that bound condition is given. If, in convergence judgment step (5), the amplitude distribution $A_{IMG}(x, y)$ on the reconstruction image plane 30, obtained through that inverse Fourier transform, is found to be substantially equal to the pixel value of the input image, then the multivalued (quantized) phase distribution $\phi_{HOLO}(u, v)$ in step (3) becomes the phase distribution given to the cells 21 of the computer-generated hologram 20. If, in convergence judgment step (5), the amplitude distribution $A_{IMG}(x, y)$ obtained through inverse Fourier transform is found to be not equal to the pixel value of the input image, then a bound condition is imparted in step (6) in such a way that the pixel value of the input image is imparted in place of the amplitude distribution $A_{IMG}(x, y)$ while the phase distribution $\phi_{IMG}(x, y)$ obtained through inverse Fourier transform is maintained intact. After such a bound condition has been imparted, a loop of steps (2)→(3)→(4)→(5)→(6) is repeated until the condition for step (5) is satisfied or converged, which results in the final desired computer-generated hologram 20.

It is acceptable to perform the given multivalued processing after the condition for step (5) has been satisfied without performing multivalued processing on the phase distribution $\phi_{HOLO}(u, v)$ in step (3).

The depth distribution of an actual hologram is determined from the thus obtained multivalued phase distribution $\phi_{HOLO}(u, v)$. For such a transmission hologram as used herein, the depth is transformed into the depth D(x, y) of the computer-generated hologram 20 on the basis of the following equation (1).

$$D(u, v) = \lambda \phi_{HOLO}(u, v)/\{2\pi(n_1 - n_0)\} \quad (1)$$

Figure 3:
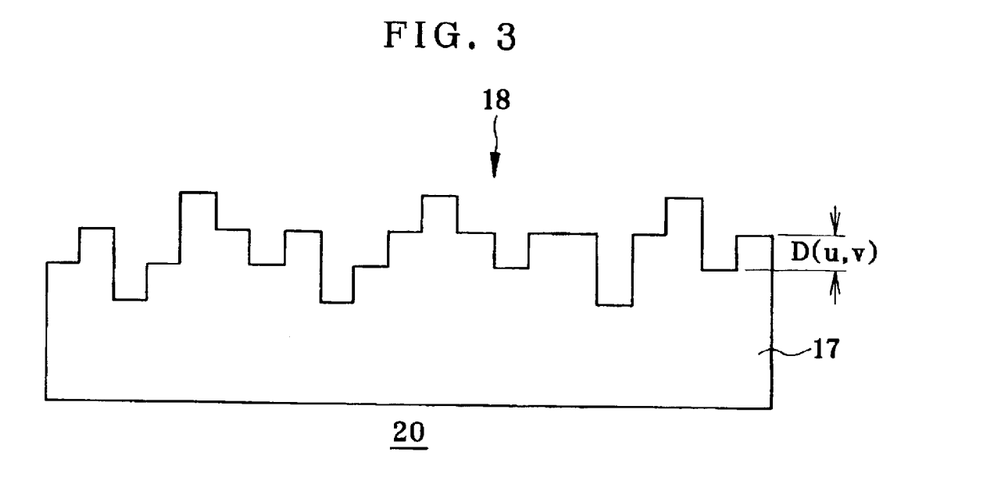
FIG. 3 is illustrative in section of one exemplary construction of the computer-generated hologram of the invention.

Here λ is the center wavelength used, and $n_1$ and $n_0$ are the refractive indices of two materials that form the transmission hologram. As shown typically in the sectional view of FIG. 3, a relief pattern 18 having a depth D(u, v) found from equation (1) is formed on the surface of a transparent substrate 17 so that the computer-generated hologram 20 of the invention can be obtained. FIG. 3 is illustrative of a specific example of $\phi_{HOLO}(u, v)$ multivalued to four levels of 0, π/2, π and 3 π/2. It is here noted the coordinates (u, v) on the hologram surface 20 are provided to make a difference with the coordinates (x, y) on the reconstruction image plane 30, with the u-axis direction corresponding to the x-axis direction and the v-axis direction to the y-axis direction.

The computer-generated hologram 20 is designed such that, as already described, any desired pattern of any desired size can be reconstructed within the range of the image area 30 having an x-axis length $L_x$ and a y-axis length $L_y$. However, when the size of the pattern to be reconstructed is too large within the $L_y \times L_x$, there are several problems.

The first problem is that when the size of the reconstructed pattern that occupies the image area 30 is relatively large, the number of multivalued levels of the computer-generated hologram 20 decreases. As already described, there is the Fourier transform relation between the surface of the computer-generated hologram 20 and the plane of the reconstruction image area 30; to record the pattern to be reconstructed all over the reconstruction image area 30 in the computer-generated hologram 20, that pattern must be recorded therein at the maximum spatial frequencies of $1/(2\delta_x)$ (x-axis direction) and $1/(2\delta_y)$ (y-axis direction) that are recordable in the computer-generated hologram 20. As a result, there is no option but to limit the number of multivalued levels for recording the phase distribution of the computer-generated hologram 20 to two, i.e., 0 and π. However, when the number of multivalued levels is two, the diffraction efficiency is barely 40.5% at most; when the pattern to be theoretically reconstructible all over the image area 30 by the computer-generated hologram 20 is recorded therein, the brightness of the reconstructed image will inevitably become low, and bright conjugate images will be reconstructed in an in-line overlapping manner, resulting in the desired pattern being difficult to see.

Figure 4A:
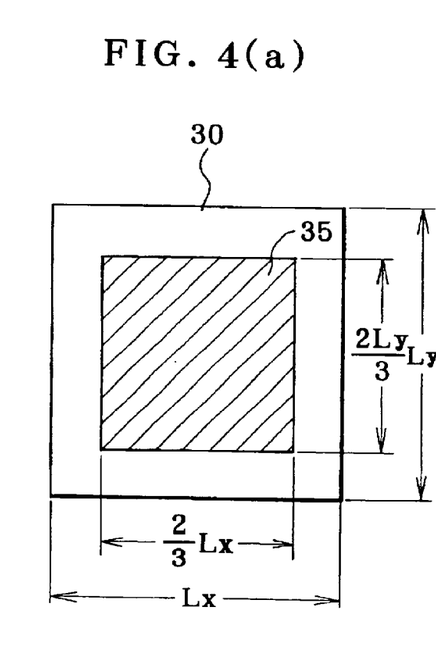
FIGS. 4(a) and 4(b) are illustrative of specific examples of the range of the reconstruction image area, in which the pattern is to be reconstructed.

To record a pattern in the computer-generated hologram 20 in such a way that the pattern can be reconstructed in a ⅔×⅔ range 35 rather than all over the reconstruction image area 30, as shown in FIG. 4(a), that pattern must be recorded at the maximum spatial frequencies of $1/(3\delta_x)$ and $1/(3\delta_y)$, so that the diffraction efficiency may reach a maximum of 68.4% with three multivalued levels of the phase distribution recorded, resulting in a brighter reconstructed image. However, conjugate images reconstructed in an in-line overlapping manner pose an obstacle to viewing.

Figure 4B:
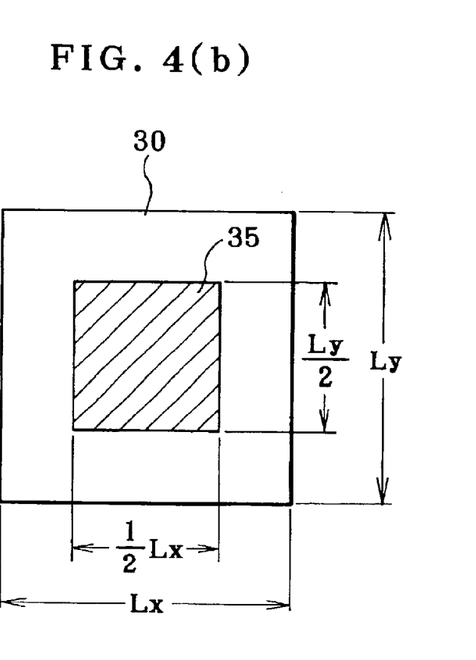

When, at this time, the pattern is recorded in the computer-generated hologram 20 in such a way that the pattern can be constructed in a ½×½ range 35 rather than all over the reconstruction image area 30, as shown in FIG. 4(b), the diffraction efficiency reaches a maximum of 81.1% with four multivalued levels of the phase distribution recorded, viz., at 0, π/2, π and 3π/2. Such high diffraction efficiency ensures that the reconstructed image is of sufficient brightness and that the conjugate images reconstructed in an in-line overlapping manner are little noticeable.

Figure 5A:
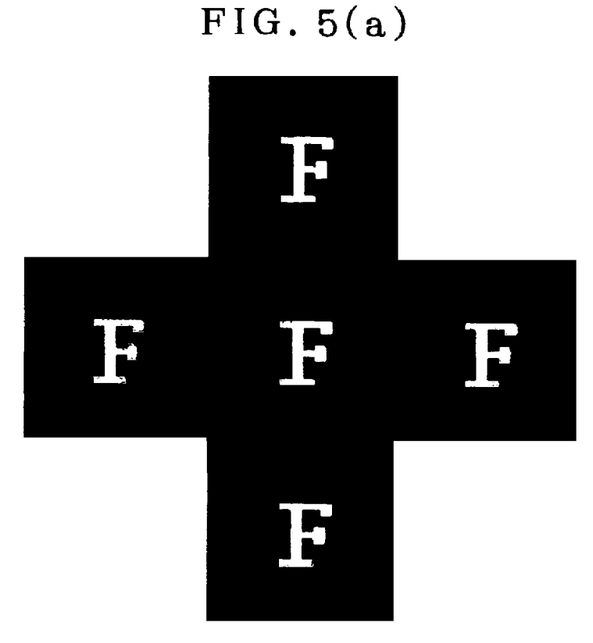
FIGS. 5(a) and 5(b) are illustrative of the desired pattern reconstructed in the reconstruction image area and higher-order images around the same.
Figure 5B:
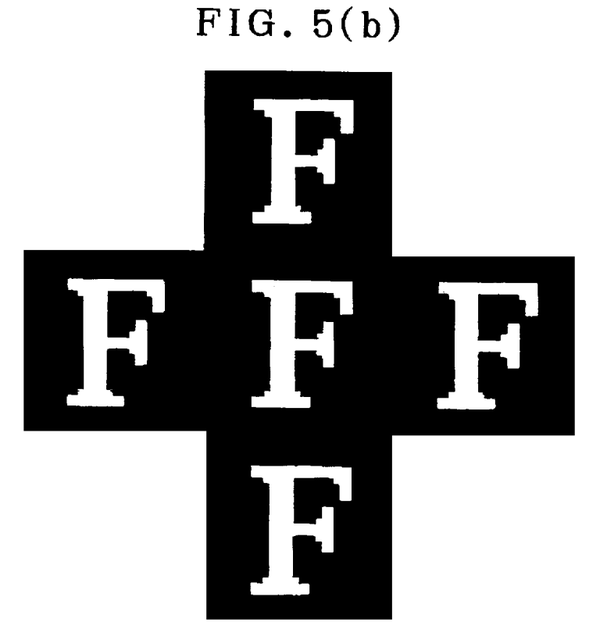

The second problem concerns higher-order images reconstructed around the reconstruction image area 30. In the computer-generated hologram 20, the cells 21 each having a size $\delta_x$ in the x-axis direction and a size $\delta_y$ in the y-axis direction are arranged in a matrix array; a diffraction grating having a grating space $\delta_x$ in the x-axis direction and a diffraction grating having a grating space $\delta_y$ in the y-axis direction are superposed on the phase distribution $\phi_{HOLO}(u, v)$. Accordingly, the diffraction grating having a grating space $\delta_x$ and the diffraction grating having a grating space $\delta_y$ become carriers in the x- and y-axis directions, respectively, producing ± first-order unnecessary diffracted light. Consequently, four higher-order images "F" in the same pattern as the desired reconstructed image "F" are reconstructed at areas around and adjacent to the desired pattern "F", as shown in FIGS. 5(a) and 5(b). In FIG. 5(a), the pattern is recorded in the hologram in such a way that the pattern "F" is reconstructed in an at most ½×½ range of the reconstruction image area 30 (corresponding to a rectangular area where a vertical bar crosses a horizontal bar), and in FIG. 5(b), the pattern is recorded in such a way that the pattern "F" is reconstructed in an at least ⅔×⅔ range of the reconstruction image area 30 (corresponding to a rectangular area where a vertical bar crosses a horizontal bar).

As can be seen from a comparison of FIG. 5(a) with FIG. 5(b), it is not preferable to record the pattern in the computer-generated hologram 20 in such a way that the pattern is reconstructed substantially all over the reconstruction image area 30, because noticeable higher-order images are reconstructed around and overly close to the desired pattern "F" reconstructed in the reconstruction image area 30 as shown in FIG. 5(b), posing an obstacle to viewing. By contrast, when the pattern reconstructed in an at most ½×½ range of the reconstruction image area 30 is recorded in the computer-generated hologram 20, the higher-order images reconstructed are relatively far away from around the desired pattern "F" reconstructed in the reconstruction image area 30, and so are less noticeable and obstructive.

Figure 6:
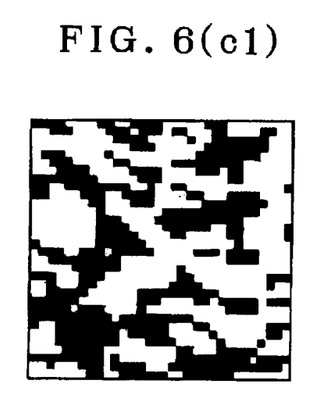

The third problem concerns a photomask that is used to fabricate the multivalued phase distribution $\phi_{HOLO}(u, v)$ of the computer-generated hologram 20 by means of photolithography. FIG. 6 is illustrative of two photomasks that are used for recording input images shown FIGS. 6(a1) and 6(a2) as a Fourier transform hologram having only a phase distribution $\phi_{HOLO}(u, v)$ at four multivalued levels. FIGS. 6(b1) and 6(b2) are illustrative of a photomask pattern for implementing a phase modulation π, and FIGS. 6(c1) and 6(c2) of a photomask pattern for implementing a phase modulation π/2. In this embodiment, each photomask pattern is divided into 32×32 portions. The input image of FIG. 6(a1) is an input image pattern that is to be reconstructed in an at most ½×½ range of the reconstruction image area 30, and the input image of FIG. 6(a2) is an input image pattern that is to be reconstructed in an at least ½×½ range of the reconstruction image area 30.

How to obtain a phase distribution having four multivalued levels using the photomask ((b1), (b2)) for implementing the phase modulation π and the photomask ((c1), (c2)) for implementing the phase modulation π/2 is now explained. For instance, when two pattern alignments and etching of a transparent substrate 17 are performed using a positive resist, alignment operation is carried out while an opening in the phase modulation π photomask and an opening in the phase modulation π/2 photomask are placed one upon another, thereby obtaining a 3π/2 phase portion; alignment operation is performed while the opening in the phase modulation π photomask and a light-shielding portion of the phase modulation π/2 photomask are placed one upon another, thereby obtaining a π phase portion; alignment operation is performed while the light-shielding portion of the phase modulation π photomask and the opening in the phase modulation π/2 photomask are placed one upon another, thereby obtaining a π/2 phase portion; and alignment operation is performed while the light-shielding portion of the phase modulation π photomask and the light-shielding portion of the phase modulation π/2 photomask are placed one another, thereby obtaining a 0 phase portion.

As can be seen from comparisons of FIGS. 6(a1) to 6(c1) with FIGS. 6(a2) to 6(c2), in the cases of FIGS. 6(a2) to 6(c2), isolated patterns are likely to occur on the photomask for fabricating the computer-generated hologram 20, as shown by arrows in FIG. 6(b2) In the cases of FIGS. 6(a1) to 6(c1), by contrast, such isolated patterns hardly occur. The presence of those isolated patterns on the photomask leads to problems such as poor pattern reproducibility of the computer-generated hologram 20 fabricated using the same and increased noise light, because the isolated patterns are rounded off during photolithography or transfer.

As described above, the first to third problems are all solved by the invention. Specifically, the computer-generated hologram 20 of the invention comprises minuscule cells having pitches $\delta_x$ and $\delta_y$, with a reconstruction image area 30 defined by a range of spreading of ± first-order diffracted light of given wavelength from a diffraction grating having grating pitches $2\delta_x$ and $2\delta_y$ that are twice as large as said pitches, and an input image pattern, reconstructed at that wavelength in a range of up to $2/3$, preferably up to $1/2$ of the reconstruction image area 30, is recorded in said computer-generated hologram 20. It is thus possible to achieve a Fourier transform hologram comprising a computer-generated hologram for holographic spectacles, which enables bright patterns with less noticeable conjugate or higher-order images to be viewed in place of light sources in the scene viewed through the spectacles, and is easy to fabricate with consistent characteristics.

While the invention has been described with specific embodiments of the holographic spectacles and the computer-generated hologram for the same, it is understood that the invention may be modified in various fashions. It is also understood that the computer-generated hologram of the invention may be applicable to a holographic monocle as well as to windows or displays.

As can be understood from the foregoing, the present invention provides a holographic viewing device and a computer-generated hologram for the same. Specifically, the computer-generated hologram of the invention comprises minuscule cells having pitches $\delta_x$ and $\delta_y$, with a reconstruction image area defined by a range of spreading of ± first-order diffracted light of given wavelength from a diffraction grating having grating pitches $2\delta_x$ and $2\delta_y$ that are twice as large as said pitches, and an input image pattern, reconstructed at that wavelength in a range of up to $2/3$ of the reconstruction image area, is recorded in said computer-generated hologram. It is thus possible to achieve a Fourier transform hologram comprising a computer-generated hologram for holographic spectacles, which enables bright patterns with less noticeable conjugate or higher-order images to be viewed in place of light sources in the scene viewed through the spectacles, and is easy to fabricate with consistent characteristics.

I claim:

1. A holographic viewing device comprising a frame and a computer-generated hologram constructed as a transmission Fourier transform hologram and fitted in said frame, wherein said computer-generated hologram comprises minuscule cells having pitches $\delta_x$ and $\delta_y$, with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern, reconstructed at said wavelength in a range of up to $2/3$ of said reconstruction image area, is recorded in said computer-generated hologram.

2. The holographic viewing device according to claim 1, wherein said input image pattern, reconstructed in a range of up to $1/2$ of said reconstruction image area for said computer-generated hologram, is recorded in said computer-generated hologram.

3. The holographic viewing device according to claim 1 or 2, wherein said computer-generated hologram comprises a phase hologram.

4. The holographic viewing device according to claim 3, where said computer-generated hologram has a phase distribution multivalued to four or more levels.

5. A computer-generated hologram constructed as a transmission Fourier transform hologram for a viewing device, wherein said computer-generated hologram comprises minuscule cells having pitches $\delta_x$ and $\delta_y$, with a reconstruction image area defined by a range of spreading of ± first-order diffracted light of given wavelength from a diffraction grating having grating pitches $2\delta_x$ and $2\delta_y$ that are twice as large as said pitches of cells, and an input image pattern, reconstructed at said wavelength in a range of up to $2/3$ of said reconstruction image area, is recorded in said computer-generated hologram.

6. The computer-generated hologram according to claim 5, wherein said input image pattern, reconstructed in a range of up to $1/2$ of said reconstruction image area for said computer-generated hologram, is recorded in said computer-generated hologram.

7. The computer-generated hologram according to claim 5 or 6, which comprises a phase hologram.

8. The computer-generated hologram according to claim 7, which has a phase distribution multivalued to four or more levels.

* * * * *